3,694,360
FERRIMAGNETIC GLASS-CERAMICS
Edward A. Weaver, Toledo, Ohio, assignor to
Owens-Illinois, Inc.
No Drawing. Filed Aug. 12, 1971, Ser. No. 171,345
Int. Cl. C04b 35/26; C03c 3/04
U.S. Cl. 252—62.59
12 Claims

ABSTRACT OF THE DISCLOSURE

Ferrimagnetic glass-ceramics prepared from thermally and spontaneously crystallizable compositions based on a simple ternary glass system $Fe_2O_3$-$Li_2O$-$SiO_2$, wherein the predominant crystalline phase is lithium ferrite ($LiFe_5O_8$). The addition of minor amounts of modifiers or nucleants, such as ZnO, to the basic ternary composition of this invention provides a greater degree of control over the crystallization of the thermally crystallizable compositions and further enhances the development and growth of ferrite crystals and the magnetic properties of the ferrites. The glass-ceramics prepared from the simple glass systems and by the methods of this invention have magnetic properties which make them useful in the manufacture of computer memory cores, radio coils, pulse transformers and other assorted electronic devices which are designed to operate at microwave frequencies.

BACKGROUND OF THE INVENTION

This invention relates to simple ternary glass compositions, methods for the preparation of such compositions and ferrimagnetic articles of manufacture produced therefrom. Ferrites are magnetic crystalline materials containing ions having permanent magnetic dipoles. These oriented dipoles arrange themselves in domains within the ferrite to form localized regions in which all of the elementary dipoles are aligned in a common direction. The ferrites of this invention are generally classified as spinels, or more properly, inverse spinels of the type which are represented by the empirical formula $MFe_2O_4$, where M can be $Fe^{2+}$, Ni and

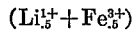
$(Li_{.5}^{+} + Fe_{.5}^{3+})$

The preparation of magnetic ceramic ferrites has in the past proven complex, time-consuming and quite expensive, with the principal technical difficulty being the reproduction of ferrites of like quality and properties.

Representative of the patent literature relating to lithium ferrites and their preparation from glass systems are U.S. Pats. 3,193,503 (issued to W. E. Smith); 3,492,273 (issued to P. C. Schultz); and 3,563,898 (issued to Neichi, et al.).

My invention is the discovery of a crystallizable composition, based on the simple glass system

$Fe_2O_3$-$Li_2O$-$SiO_2$ which can be controllably or spontaneously crystallized to lithium ferrites ($LiFe_5O_8$) of like quality and properties. My invention also includes ZnO modified glass systems having a somewhat enhanced degree of crystallization and improved magnetic properties.

The ferrites prepared from the compositions and by the process of this invention have low saturation magnetization, small coercive force, good squareness ratio and rapid switching times which make them highly desirable materials for use in apparatus operating at microwave frequencies.

SUMMARY OF THE INVENTION

My invention is a homogeneous thermally crystallizable glass composition having a liquidus temperature ranging from about 1100 to 1400° C. which comprises the following ingredients in the approximate relative concentrations:

| Ingredients: | Parts by wt. |
|---|---|
| $Fe_2O_3$ | 35–60 |
| $Li_2O$ | 3.5–20 |
| $SiO_2$ | 10–60 |

The crystallizable compositions of this invention can also contain from about 1 to 25 parts by weight nucleants, such as ZnO, to further enhance the crystallization and magnetic properties of the ferrites.

In the preferred embodiments of my invention the thermally crystallizable glass compositions should have an $Fe_2O_3$ content ranging from about 40 to 55 parts by weight with those compositions having approximately 40 parts by weight $Fe_2O_3$ being most preferred.

Additional embodiments of my invention include a process for the preparation of glass-ceramics from the previously described crystallizable compositions and articles of manufacture prepared therefrom.

DESCRIPTION OF THE INVENTION INCLUDING PREFERRED EMBODIMENT

Basic ternary glass system

The thermally and spontaneously crystallizable compositions of this invention are based on the simple ternary glass system $Fe_2O_3$-$Li_2O$-$SiO_2$, and comprise approximately 35 to 60 parts by weight, $Fe_2O_3$, 3.5 to 20 $Li_2O$, and 10 to 60 $SiO_2$.

Modifier or nucleants, such as ZnO, can be added to the composition to further enhance the degree of crystallization and magnetic properties of the lithium ferrite in the glassy matrix. Compositions containing minor amounts of nucleants in the following approximate proportions represent one of the preferred embodiments of this invention.

| Ingredients: | Parts by wt. |
|---|---|
| $Fe_2O_3$ | 35–55 |
| $Li_2O$ | 5–15 |
| $SiO_2$ | 10–50 |
| ZnO | 1–15 |

The most preferred compositions of this invention are prepared from the basic ternary glass systems which contain approximately 40 parts by weight $Fe_2O_3$.

The electrical and magnetic properties of the compositions of this invention are dependent upon, among other factors, the maintenance of a low $Fe^{2+}/Fe^{3+}$ ratio within the composition. The reduction of ferric ions is known to be effected by the heating of such ions at elevated temperatures. In order to minimize this conversion, the temperatures used in the preparation of a melt from the batch ingredients of the compositions of this invention are arbitrarily limited to a maximum of about 1400° C. This limitation on processing temperatures indirectly restricts the relative concentration of $Fe_2O_3$ in the compositions of this invention, since compositions having in excess of about 60 parts by weight $Fe_2O_3$ have liquidus temperatures in excess of 1400° C.

GLASS COMPOSITION PREPARATION

Ingredients

A number of the various batch ingredients that are present in the simple glass compositions of this invention can be originally added to the crucible in the form of oxides, carbonates, nitrates or other precursor compounds. For example, batch materials such as lithium carbonate or nitrate can serve as the source of the lithium oxide when initially blended with the other components of the composition during preparation of the thermally crystallizable compositions of this invention.

All the ingredients of both the basic ternary glass system and modified glass system of this invention are available as reagent grade chemicals and do not require any special or elaborate preparation.

Of course, functionally insignificant amounts of other ingredients can be present as impurities in the batch materials provided, however, that they do not have any appreciable effect on the degree or distribution of crystals throughout the glassy matrix of the compositions of this invention or have any substantial effect on electrical and magnetic properties. With regard to this last point, special care should be exercised to insure that the compositions of this invention are kept relatively free from $Na_2O$ and $Al_2O_3$ in order to avoid formation of an acmite/albite crystalline phase of the type disclosed by P. C. Schultz in his previously cited patent.

Processes

The following processes can be used in the preparation of each of the crystallizable compositions of this invention, with the only minor variations being the relative proportions of the batch materials undergoing processing.

In accordance with this invention, homogenous, thermally crystallizable glass, and glass-ceramic compositions can be prepared from the previously described simple glass systems of this invention in the following manner:

(a) The ingredients of the specific systems are initially combined by mixing them in the appropriate proportions. The order of addition does not appear to be critical and mixing prior to heating does facilitate the melting process.

(b) After the ingredients of the composition are intimately admixed, a platinum crucible containing the admixture is placed in an electric muffle furnace or other equivalent device where it is heated in an air atmosphere for the minimum interval of two hours after its contents become fluid. The temperature at which the composition becomes liquidus is variable; those compositions having from about 30 to 35 parts by weight $Fe_2O_3$ melting at about 1200° C., while compositions having from about 40 to 60 parts by weight $Fe_2O_3$ requiring temperatures of about 1300–1400° C. The contents of the crucible are stirred occasionally during the melting cycle in order to insure homogeneity.

(c) The melt is then cast or pressed into useful shapes by standard casting or pressing techniques. The method of forming will vary depending upon the $Fe_2O_3$ content of the composition. Those compositions having from about 35 to 50 parts by weight $Fe_2O_3$ should be formed in a manner consistent with rapid quenching in order to avoid or minimize the degree of spontaneous crystallization, whereas compositions having from about 51 to 60 parts by weight $Fe_2O_3$ should be formed in a manner consistent with slow quenching in order to maximize the degree of spontaneous crystallization.

(d) Following initial forming, the glass is quenched, either rapidly or gradually, as the case may be, depending upon its $Fe_2O_3$ content. Once the glass is cooled, it can be cut, ground, or tooled until it is formed into the shape of the article being prepared.

(e) The quenched glass is then returned to the furnace and heated in an oxidizing environment to a temperature ranging from about 700 to 1000° C. for 2 to 16 hours. Heat-treating the glass or glass-ceramic compositions results in the growth of lithium ferrite crystals in the glassy matrix. Those compositions which partially devitrify upon cooling are further crystallized upon heat-treating. Heat-treating at the more elevated temperature, as for example at 900 to 1000° C., causes the growth of larger crystals and a greater degree of crystallization of lithium ferrite within the glassy matrix and is therefore preferred. In one of the preferred embodiments of this invention, the glass and glass-ceramics are heat-treated in an oxygen-rich atmosphere. Saturation of the heat-treating environment with oxygen facilitates the growth of larger and greater concentrations of lithium ferrite crystals.

(f) Following heat-treatment, the glass-ceramic is cooled to room temperature.

PHYSICAL, DIELECTRIC AND MAGNETIC PROPERTIES

Physical properties

The ferrite crystal structure of these compositions was studied by X-ray analysis and with the aid of an optical and electron microscope. X-ray diffractograms were made on powdered specimens with a Siemens X-ray diffractometer, using copper $K\alpha$ radiation and a nickel filter for the diffracted beam in accord with Guinier X-ray techniques. Optical and electron microscope specimens were prepared by polishing the surface of the samples to be examined with a fine abrasive.

Optical photomicrographs, taken at magnifications of 500×, of thermally and spontaneously crystallized samples reveal the presence of discrete dendritic and prismatic crystals against an amorphous background.

The distribution and concentration of the different types of crystals within the ferrite ceramic is usually dependent upon the $Fe_2O_3$ content of the composition, the thermal history of the composition and its method of preparation.

The volume of crystalline lithium ferrite in the heat-treated compositions of this invention usually varies directly with the $Fe_2O_3$ content of the composition. The crystal volume of various compositions can range from about 8 percent by volume for samples having 40 parts by weight $Fe_2O_3$-to-about 46 percent by volume for 60 parts by weight $Fe_2O_3$ samples. As crystal density increases, there is a tendency for the crystals to aggregate in clusters. Individual dendritic crystals have been observed in the lower $Fe_2O_3$ compositions having main stems in excess of $500\mu$ in length and up to $5\mu$ in girth. Individual prismatic crystals have also been observed in similar samples measuring up to $40\mu$ around. Prismatic crystals are generally found in samples containing in excess of about 50 parts by weight $Fe_2O_3$ and are difficult to observe except in clusters.

Mossbauer spectrophotometric analysis of several of the samples of the composition of this invention indicate that the predominant crystalline phase of these compositions is lithium ferrite and that there is little $Fe^{2+}$ present in the samples.

X-ray diffraction patterns of the crystalline ferrite composition of this invention were also made. The lattice parameters of the crystals in the samples measured were somewhat smaller than those reported in the literature, M. Shieber, J. Inorg, Nuc. Chem., 26, 1363 (1964) and may indicate some substitution of $Fe^{3+}$ by $Si^{4+}$ in the tetrahedral sites of the $LiFe_5O_8$. Any substitution by $Si^{4+}$ in $LiFe_3O_8$ would tend to give smaller lattice parameters and have the effect of lowering the electrical resistivity of the crystalline ferrite.

The density of several samples having different thermal histories and $Fe_2O_3$ content were also calculated and the following conclusions reached. That, the samples having the lower $Fe_2O_3$ content (30 to 40 parts by weight) showed the most dramatic increase in density after heat-treatment at temperatures ranging from about 500 to 875° C., while the only slight density shifts occur in samples prepared from compositions having larger $Fe_2O_3$ concentrations.

At temperatures from about 700° C. and above, the duration of heat-treatment, in excess of a minimum interval of about 2 hours, appears to have little, if any, effect upon increasing density; whereas the heat-treating of compositions below 700° C. usually requires a minimum interval of about 4 hours for the maximization of density, irrespective of the temperature in this less preferred temperature range. Heat-treatment temperatures can vary with variations in the compositional makeup of the ferrites, higher temperatures usually being required in the crystallization of lower $Fe_2O_3$ containing samples. The heat-treatment temperatures can range from about 525 to 875° C., with a temperature of about 700° C. being preferred for most of the ferrites of this invention.

The exact heat-treatment temperature required for the crystallization of lithium ferrite is dependent upon the $Fe_2O_3$ content of the given composition. Usually, compositions having $Fe_2O_3$ concentrations of about 30 to 40 parts by weight require more vigorous heating at higher temperatures to initiate crystal growth.

Because anomalies are known to occur in thermal expansion for some ferroelectric materials at the Curie temperature, thermal expansion measurements were made on a representative sampling of the compositions of this invention with a quartz tube dilatometer over a temperature range of 0 to 800° C. Linear thermal expansion measurements were also made for these same materials over a temperature range of 0 to 300° C.

Coefficients of thermal expansion for samples of the composition of this invention were found to range between about 85 to $100 \times 10^{-7}/°$ C. (over a range of 0 to 300° C.), with no readily discernible correlation between composition and co-efficient and no anomalous expansion.

Magnetic properties

Magnetic measurements were made on a representative number of samples of the compositions of this invention in order to evaluate the effect the relative concentration of ingredients, thermal history and method of preparation have on such properties. The field strength (H) and induction (B) of the various samples were determined by placing the sample in a 1000 oersted cyclically alternating applied field electromagnet and recording the current induced. The values which are of primary concern with respect to the compositions of this invention are the maximum magnetic induction ($B_m$), the residual flux, or remanence, ($B_r$) and coercivity ($H_c$).

Testing and evaluation of the data indicated that with respect to the above values, the compositions of this invention fell into two distinct groups: Group A, basic ternary compositions, having about 40 parts by weight $Fe_2O_3$, and Group B, all other compositions of this invention.

The maximum magnetic induction ($B_m$) at an applied field of a 1000 oersteds as measured on a Scientific-Atlanta Model 651B B-H meter, appears to vary directly with $Fe_2O_3$ content of the sample and its thermal history. Heat-treatment of Group A samples at temperatures ranging from about 550 to 650° C. causes a dramatic increase in the $B_m$ of these samples, with the increment of change in $B_m$ at higher temperatures (circa 650 to 850° C.) being substantially less pronounced. The maximum magnetic induction recorded for Group A samples was about 200 gauss, while $B_m$ for Group B materials ranged from 200 to about 1800 gauss, increasing almost linearly with increases in $Fe_2O_3$ content.

The residual flux, or remanence ($B_r$) also appears to be a function of compositional makeup and thermal history of the respective compositions. Group A compositions, as before, demonstrated the most dramatic change in residual flux with heat-treatment, increasing an average of 100 to 300 percent, depending upon the particular composition, to about 80 to 100 gauss after heat-treatment at temperatures in the range of about 750° C. The values for residual flux also vary directly with $Fe_2O_3$ content, declining rapidly with decreasing concentration of iron oxide.

The coercive force, ($H_c$), which is generally defined as the reverse field force which is necessary to reduce the intensity of the (residual) magnetization to zero, also varies from composition to composition, depending upon the thermal history and the crystal dimensions of the ferrite. The coercive force for Group A materials increases rapidly with heat-treatment at temperatures of about 800° C. to a peak value approaching 160 oersteds. Schultz has shown that coercivities of about 150 oersteds correspond to ferrite crystals of about 1 micron in size, "A Study of the Growth of Lithium Ferrite From a Silicate Glass," PhD. thesis, Rutgers University, 1967. Schultz's values correspond with the values recorded for the coercivities and the electron photomicrographs of the Group A compositions. The coercivities for heat-treated compositions of Group B ranged from 3 to 25 oersteds. Correlation of coercivity with particle size would tend to indicate that the ferrite crystals of the composition of this latter group range in size from 2 to 8 microns.

Dielectric properties

The dielectric properties of ferrites of this invention were next considered because the dielectric constant and loss factors of the specific composition can decide or limit the eventual use of such materials.

The electrical resistance of the various ferrites of this invention are believed to be critically dependant upon the relative proportions of ingredients in the particular composition, the $Fe^{2+}/Fe^{3+}$ ratio and crystal environment, in order of decreasing importance.

In addition, modification of the basic ternary glass system with ZnO in a number of the compositions of this invention can sharply reduce the AC resistivity of the particular composition even further, this being especially true in the heat-treated samples of this invention. It is thought that heat-treating ZnO modified composition generates $Zn^{2+}$ which are substituted into the ferrite lattice, further reducing AC resistivity.

It is generally accepted by those skilled in the art that dielectric materials which have low AC resistivities generally prove to have high dielectric loss. Lithium ferrite-silica systems characteristically have demonstrated low AC resistivities, $pac \simeq 10^4$, which implies large dissipation factors (dielectric loss, $tan \simeq 70$ percent at 0.5 mHz.). The large dielectric loss of the material of this invention is thought to be due in part to interfacial polarization. This phenomenon occurs when low resistivity crystals are separated from their neighboring crystals by a thin layer of high resistance material, such as an amorphous glassy matrix. When an electrical charge accumulates on these thin layers of electrically resistant material, this results in the introduction of a dispersion into the dielectric constant over a given frequency range. This dispersion, when superimposed onto the dielectric loss spectrum for the ferrite of a given composition, results in high dielectric loss for the given material. It is, therefore, believed that the amount, arrangement and type of crystals present are the prime, if not the sole, determinant of dielectric properties, with the total $Fe_2O_3$ content playing a rather insignificant role.

Evaluation of the dielectric properties of the samples of the composition of this invention indicate that only those predominantly amorphous compositions, compositions having about 35 parts by weight $Fe_2O_3$ or less, can be considered as practical candidates for dielectric devices.

The examples which follow further illustrate the compositions, processes and articles of manufacture of this invention. Parts and percentages, where used in such examples, are by weight, unless otherwise stipulated.

EXAMPLE I

Two hundred grams of a formulation comprising 40.91 weight percent $Fe_2O_3$, 10.91 weight percent $Li_2O$, 39.09 weight percent $SiO_2$ ("Amersil Type F" Amersil Inc., Hillside, New Jersey) and 9.09 weight percent ZnO are thoroughly mixed in a platinum crucible, placed in an electric muffle furnace and heated to a temperature of about 1400° C. in an oxidizing environment until fluid and homogenous. The melt is stirred occasionally to insure homogeneity and then cast into bars ¼" x 2½" x 1½" in size. The bars are rapidly quenched between metal plates in order to minimize devitrification. When sufficiently cooled, the bars are cut into smaller bars ¼" x ¼" x 2" in size and discs 1" in diameter. These smaller bars and discs are heat-treated in an oxidizing atmosphere at temperatures of about 1000° C. for a period of at least two, but not more than 16 hours.

The ferrimagnetic materials thus produced have the requisite crystalline, magnetic and electrical properties which make them useful in the manufacture of electronic devices operable at microwave frequencies.

EXAMPLE II

A ferrimagnetic bar ¼″ x ¼″ x 2″ is prepared according to the procedure of Example I from a composition having the approximate weight percentages:

| Ingredients: | Weight |
|---|---|
| $Fe_2O_3$ | 45.05 |
| $Li_2O$ | 9.91 |
| $SiO_2$ | 36.04 |
| ZnO | 9.01 |

The bar thus produced has magnetic properties which make it useful in the preparation of computer memory cores, pulse transformers and assorted devices designed to operate at microwave frequencies.

EXAMPLE III

A ferrimagnetic bar ¼″ x ¼″ x 2″ is prepared according to the procedure of Example I from a composition having the approximate weight percentages:

| Ingredients: | Weight |
|---|---|
| $Fe_2O_3$ | 50.00 |
| $Li_2O$ | 9.55 |
| $SiO_2$ | 31.36 |
| ZnO | 9.09 |

The bar thus produced has magnetic properties which make it useful in the preparation of computer memory cores, pulse transformers and assorted devices designed to operate at microwave frequencies.

EXAMPLE IV

A ferrimagnetic bar ¼″ x ¼″ x 2″ is prepared according to the procedure of Example I from a composition having the approximate weight percentages:

| Ingredients: | Weight |
|---|---|
| $Fe_2O_3$ | 54.55 |
| $Li_2O$ | 9.09 |
| $SiO_2$ | 27.27 |
| ZnO | 9.09 |

The bar thus produced has magnetic properties which make it useful in the preparation of computer memory cores, pulse transformers and assorted devices designed to operate at microwave frequencies.

EXAMPLE V

A ferrimagnetic bar ¼″ x ¼″ x 2″ is prepared according to the procedure of Example I from a composition having the approximate weight percentages:

| Ingredients: | Weight |
|---|---|
| $Fe_2O_3$ | 56.67 |
| $Li_2O$ | 7.41 |
| $SiO_2$ | 23.10 |
| ZnO | 12.82 |

The bar thus produced has magnetic properties which make it useful in the preparation of computer memory cores, pulse transformers and assorted devices designed to operate a microwave frequencies.

EXAMPLE VI

A ferrimagnetic bar ¼″ x ¼″ x 2″ is prepared according to the procedure of Example I from a composition having the approximate weight percentages:

| Ingredients: | Weight |
|---|---|
| $Fe_2O_3$ | 60.45 |
| $Li_2O$ | 6.74 |
| $SiO_2$ | 19.17 |
| ZnO | 13.64 |

The bar thus produced has magnetic properties which make it useful in the preparation of computer memory cores, pulse transformers and assorted devices designed to operate at microwave frequencies.

What is claimed is:

1. A homogenous thermally crystallizable glass composition substantially free of soda and alumina, having a liquidus temperature in the range of about 1100 to 1400° C., comprising the following ingredients in the approximate relative concentrations:

| Ingredients: | Parts by wt. |
|---|---|
| $Fe_2O_3$ | 35–60 |
| $Li_2O$ | 3.5–20 |
| $SiO_2$ | 10–60 |

2. The homogenous thermally crystallizable glass composition as defined in claim 1 wherein the following ingredients have the approximate relative concentrations:

| Ingredients: | Parts by wt. |
|---|---|
| $Fe_2O_3$ | 40–55 |
| $Li_2O$ | 5–15 |
| $SiO_2$ | 10–50 |
| ZnO | 5–15 |

3. The homogenous thermally crystallizable glass composition as defined in claim 1, wherein the following ingredients have the approximate relative concentrations:

| Ingredients: | Parts by wt. |
|---|---|
| $Fe_2O_3$ | 40.91 |
| $Li_2O$ | 10.91 |
| $SiO_2$ | 39.09 |
| ZnO | 9.09 |

4. The homogenous thermally crystallizable glass composition as defined in claim 1, wherein the following ingredients have the approximate relative concentrations:

| Ingredients: | Parts by wt. |
|---|---|
| $Fe_2O_3$ | 45.05 |
| $Li_2O$ | 9.91 |
| $SiO_2$ | 36.04 |
| ZnO | 9.01 |

5. The homogenous thermally crystallizable glass composition as defined in claim 1, wherein the following ingredients have the approximate relative concentrations:

| Ingredients: | Parts by wt. |
|---|---|
| $Fe_2O_3$ | 50.00 |
| $Li_2O$ | 9.55 |
| $SiO_2$ | 31.36 |
| ZnO | 9.09 |

6. The homogenous thermally crystallizable glass composition as defined in claim 1, wherein the following ingredients have the approximate relative concentrations:

| Ingredients: | Parts by wt. |
|---|---|
| $Fe_2O_3$ | 56.67 |
| $Li_2O$ | 7.41 |
| $SiO_2$ | 23.10 |
| ZnO | 12.82 |

7. The homogenous thermally crystallizable glass composition as defined in claim 1, wherein the following ingredients have the approximate relative concentrations:

| Ingredients: | Parts by wt. |
|---|---|
| $Fe_2O_3$ | 60.45 |
| $Li_2O$ | 6.74 |
| $SiO_2$ | 19.17 |
| ZnO | 13.64 |

8. A ferrimagnetic glass-ceramic article of manufacture, having a linear coefficient of thermal expansion in the range of about 85 to $100 \times 10^{-7}$/° C. over the temperature range of 0–300° C. and substantially homogenous dispersion of lithium ferrite crystals throughout, the glass-ceramic article of manufacture having been formed by the thermal crystallization of a homogenous thermally crystallizable glass composition which has a liquidus temperature in the range of about 1100 to 1400° C. and the following ingredients in the approximate relative concentrations:

| Ingredients: | Parts by wt. |
|---|---|
| $Fe_2O_3$ | 35–60 |
| $Li_2O$ | 3–20 |
| $SiO_2$ | 10–60 |

9. The ferrimagnetic glass-ceramic article of manufacture as defined in claim 8, wherein the glass-ceramic is formed by the spontaneous crystallization of a homogenous thermally crystallizable glass composition.

10. The ferrimagnetic glass-ceramic article of manufacture as defined in claim 8, wherein the glass-ceramic is formed from a homogenous thermally crystallizable glass composition comprising the following ingredients in the approximate relative concentrations:

| Ingredients: | Parts by wt. |
|---|---|
| $Fe_2O_3$ | 40–55 |
| $Li_2O$ | 5–15 |
| $SiO_2$ | 10–50 |
| ZnO | 5–15 |

11. The ferrimagnetic glass-ceramic article of manufacture as defined in claim 8, wherein the glass-ceramic is formed from a homogenous thermally crystallizable glass composition having about 40 parts by weight $Fe_2O_3$.

12. A process for the preparation of a homogenous ferrimagnetic glass-ceramic, which comprises:
(a) preparing a melt from batch materials of a glass composition, having a liquidus temperature in the range of about 1100 to 1400° C. and the following ingredients in the approximate relative concentrations:

| Ingredients: | Parts by wt. |
|---|---|
| $Fe_2O_3$ | 35–60 |
| $Li_2O$ | 3.5–20 |
| $SiO_2$ | 10–60 |

(b) forming the melt into a useful article,
(c) quenching the article rapidly enough to minimize spontaneous crystallization of lithium ferrite in the article,
(d) reheating the quenched article at temperatures ranging from about 700 to 1000° C. for an interval sufficient to cause crystallization of lithium ferrite in the article.

References Cited
UNITED STATES PATENTS

| | | | |
|---|---|---|---|
| 2,565,111 | 8/1951 | Schoenberg | 252—62.59 |
| 3,193,503 | 7/1965 | Smith | 252—62.59 |
| 3,492,237 | 1/1970 | Schultz | 252—62.61 |

OTHER REFERENCES

Herczog "The Glass Industry," pp. 445–50, August 1967.

TOBIAS E. LEVOW, Primary Examiner

J. COOPER, Assistant Examiner

U.S. Cl. X.R.

106—39 DV, 52; 252—62.61, 62.62